(12) United States Patent
Yoshida et al.

(10) Patent No.: US 8,222,753 B2
(45) Date of Patent: *Jul. 17, 2012

(54) GENERAL PURPOSE ENGINE WITH AXIAL GAP TYPE MOTOR/GENERATOR

(75) Inventors: Kenichi Yoshida, Tokyo (JP); Toshiyuki Suzuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 432 days.

This patent is subject to a terminal disclaimer.

(21) Appl. No.: 12/379,463

(22) Filed: Feb. 23, 2009

(65) Prior Publication Data

US 2009/0230695 A1 Sep. 17, 2009

(30) Foreign Application Priority Data

Mar. 11, 2008 (JP) ................................. P2008-061873

(51) Int. Cl.
*H02K 7/18* (2006.01)
*H02K 1/22* (2006.01)
*H02K 21/12* (2006.01)

(52) U.S. Cl. .................... 290/1 A; 310/268; 310/156.32; 290/1 R

(58) Field of Classification Search .................. 290/1 A, 290/1 R; 310/156.32, 268, 153, 154.05
See application file for complete search history.

(56) References Cited

U.S. PATENT DOCUMENTS

| | | | |
|---|---|---|---|
| 5,075,616 A | 12/1991 | Mitsui | |
| 5,823,165 A * | 10/1998 | Sato et al. | 123/399 |
| 2001/0029906 A1 | 10/2001 | Suzuki | |
| 2004/0063536 A1* | 4/2004 | Atarashi | 477/3 |
| 2004/0149241 A1 | 8/2004 | Shomura et al. | |
| 2004/0261766 A1 | 12/2004 | Matsuda et al. | |
| 2005/0076877 A1* | 4/2005 | Sawamura et al. | 123/197.1 |
| 2006/0214425 A1 | 9/2006 | Yamamoto et al. | |
| 2007/0227470 A1* | 10/2007 | Cole et al. | 123/3 |
| 2008/0185205 A1* | 8/2008 | Kaminokado | 180/220 |
| 2008/0224552 A1* | 9/2008 | Ahn | 310/61 |

(Continued)

FOREIGN PATENT DOCUMENTS

JP 58-154855 U 10/1983

(Continued)

OTHER PUBLICATIONS

Macine Translation JP2005312124 (2005), JP2006166679 (2006), JP2003134737 (2003).*

(Continued)

*Primary Examiner* — Quyen Leung
*Assistant Examiner* — Jose Gonzalez Quinones
(74) *Attorney, Agent, or Firm* — McGinn IP Law Group, PLLC

(57) ABSTRACT

A general purpose engine is provided with an engine main body, a rotary shaft, and an axial gap type motor/generator. The rotary shaft is rotated by a driving force of the engine main body. The rotary shaft includes a first shaft part disposed on one side portion of the engine main body and a second shaft part disposed on another side portion of the engine main body. The axial gap type motor/generator is attached integrally to the second shaft part. The axial gap type motor/generator is provided with a power generating rotor that rotates integrally with said rotary shaft, and a stator that is attached to the engine main body. The stator is disposed on a side closer to the engine main body than the power generating rotor and at a remove from the power generating rotor.

20 Claims, 5 Drawing Sheets

U.S. PATENT DOCUMENTS

2008/0238266 A1* 10/2008 Moriyama et al. .......... 310/67 R

FOREIGN PATENT DOCUMENTS

| JP | 64-15440 A | | 1/1989 |
|---|---|---|---|
| JP | 2-97300 A | | 4/1990 |
| JP | 8-130851 A | | 5/1996 |
| JP | 2000-333427 A | | 11/2000 |
| JP | 2001-295657 | | 10/2001 |
| JP | 2003134737 A | * | 5/2003 |
| JP | 2004-166482 A | | 6/2004 |
| JP | 2004-239156 A | | 8/2004 |
| JP | 2005-16438 A | | 1/2005 |
| JP | 2005-269765 | | 9/2005 |
| JP | 2005312124 A | * | 11/2005 |
| JP | 2006166679 A | * | 6/2006 |
| JP | 2006-188980 A | | 7/2006 |
| JP | 2008-43093 A | | 2/2008 |

OTHER PUBLICATIONS

Machine Translation JP2005-269765 (2005).

Notice of Reason of Rejection dated Nov. 4, 2011 (with an English translation).

Japanese Office Action dated Nov. 4, 2011 with English translation.

* cited by examiner

GENERAL PURPOSE ENGINE WITH AXIAL GAP TYPE MOTOR/GENERATOR

CROSS-REFERENCE TO RELATED APPLICATIONS

The disclosure of Japanese Patent Application No. 2008-061873, filed on Mar. 11, 2008 including the specification, drawings and abstract is incorporated herein by reference in its entirety.

BACKGROUND OF THE INVENTION

1. Field of the Invention

The present invention relates to a general purpose engine integrated with an axial gap type motor/generator.

2. Description of the Related Art

In a typical usage application of a general purpose engine, a power generating body is externally attached to the engine as an external apparatus, and power is generated using a driving force of the engine. Japanese Unexamined Patent Application Publication No. 2001-295657 discloses a general purpose engine to which a radial gap type motor/generator (power generating body) is externally attached.

When a power generating body is externally attached to a general purpose engine, the power generating body that serves as an external apparatus must conventionally be attached to a rotary shaft of the general purpose engine, which projects sideward from the engine. However, the size and weight of a power generating body provided separately to the general purpose engine are extremely great, and therefore, when the power generating body is merely attached externally, increases in overall size and weight occur, leading to an increase in the difficulty of user handling.

SUMMARY OF THE INVENTION

It is therefore an object of the present invention to achieve reductions in the weight and size of a general purpose engine provided for a power generation application.

To solve the problems described above, a first invention provides a general purpose engine in which an axial gap type motor/generator is integrated with an engine main body. A rotary shaft that is rotated by a driving force of the engine main body includes a first shaft part disposed on one side portion of the engine main body, and a second shaft part disposed on another side portion of the engine main body. The axial gap type motor/generator is attached integrally to the second shaft part. The axial gap type motor/generator includes a power generating rotor that rotates integrally with the rotary shaft, and a stator that is attached to the engine main body and disposed on a side closer to the engine main body than the power generating rotor and at a remove from the power generating rotor. Here, a plurality of magnets are preferably attached, in circumferential direction series, to an opposing face of the power generating rotor opposing the stator, and a plurality of coils are preferably attached and connected to the stator.

Here, the first invention is preferably further provided with a back yoke disposed on the rotary shaft on a side closer to the engine main body than the stator and at a remove from the stator. Further, an attachment member that extends in a substantially linear form can also be provided, presupposing that an outer diameter of the stator is larger than an outer diameter of the back yoke. In this case, one end of the attachment member is preferably attached to the engine main body, and another end of the attachment member is preferably attached to a site of the stator having a larger diameter than the back yoke.

The first invention can be further provided with a plurality of first fins provided on the power generating rotor and arranged in the circumferential direction. In this case, an air vent if preferably provided in the power generating rotor on the inside of the first fins so as to penetrate the power generating rotor in an axial direction of the rotary shaft. Further, a fin member that rotates integrally with the rotary shaft and is inserted into a hollow site of the stator, on which a plurality of second fins are arranged in the circumferential direction, can also be provided, and the fin member can be formed integrally with the power generating rotor or the back yoke.

Furthermore, in the first invention, the power generating rotor preferably functions as a flywheel for stabilizing a rotary force of the rotary shaft using self-generated inertial force. Further, an ignition magnet for detecting a rotation angle of the rotary shaft can be attached to the power generating rotor. A recoil starter that is disposed on the outside of the power generating rotor and forcibly rotates the rotary shaft upon start-up of the engine main body can also be provided.

A second invention provides a general purpose engine in which an axial gap type motor/generator is integrated with an engine main body. A rotary shaft that is rotated by a driving force of the engine main body includes a first shaft part disposed on one side portion of the engine main body, and a second shaft part disposed on another side portion of the engine main body. The axial gap type motor/generator is attached integrally to the second shaft part. The axial gap type motor/generator includes a first flywheel that rotates integrally with the rotary shaft and stabilizes a rotary force of the rotary shaft using self-generated inertial force, and a stator which is attached to the engine main body and disposed on a side closer to the engine main body than the first flywheel and at a remove from the first flywheel, and to which a plurality of coils are connected and attached. A plurality of magnets are attached, in circumferential direction series, to an opposing face of the first flywheel opposing the stator.

The second invention preferably further includes a second flywheel which is disposed on the rotary shaft on a side closer to the engine main body than the stator and at a remove from the stator, and which functions as a back yoke. Further, an attachment member that extends in a substantially linear form can also be provided, presupposing that an outer diameter of the stator is larger than an outer diameter of the second flywheel. In this case, one end of the attachment member is preferably attached to the engine main body, and another end of the attachment member is preferably attached to a site of the stator having a larger diameter than the second flywheel.

The second invention can also include a plurality of first fins provided on the first flywheel and arranged in the circumferential direction. In this case, an air vent provided in the first flywheel on the inside of the first fins so as to penetrate the flywheel in an axial direction of the rotary shaft is preferably provided. Further, a fin member which rotates integrally with the rotary shaft and is inserted into a hollow site of the stator, and on which a plurality of second fins are arranged in the circumferential direction, can also be provided, and the fin member can be formed integrally with the first flywheel or the second flywheel.

Furthermore, an ignition magnet for detecting a rotation angle of the rotary shaft can be attached to the first flywheel. Further, a recoil starter that is disposed on a side farther away from the engine main body than the first flywheel and forcibly rotates the rotary shaft upon start-up of the engine main body can also be provided.

According to the first invention, the axial gap type motor/generator serving as a power generating body is formed integrally with the engine main body. Hence, the general purpose engine can be provided for a power generation application without attaching a separate power generating body thereto as an external apparatus. Furthermore, the axial gap type motor/generator is used as the power generating body formed integrally with the engine main body. Hence, increases in the axial direction length of the rotary shaft can be suppressed. As a result, reductions can be achieved in the size and weight of the general purpose engine when the general purpose engine is provided for a power generation application.

According to the second invention, the axial gap type motor/generator serving as a power generating body is formed integrally with the engine main body. Hence, the general purpose engine can be provided for a power generation application without attaching a separate power generating body thereto as an external apparatus. Furthermore, the axial gap type motor/generator is used as the power generating body formed integrally with the engine main body. Therefore, a function as a power generating rotor can be added to the first flywheel simply by adding a power generating magnet or the like, without greatly modifying the size and other specifications of a flywheel provided in a pre-existing general purpose engine. Hence, increases in the axial direction length of the rotary shaft can be suppressed. As a result, a power generating engine using a pre-existing general purpose engine as a base can be realized at low cost without greatly modifying the pre-existing design and specifications thereof, and moreover, reductions in size and weight can be achieved.

DESCRIPTION OF THE PREFERRED EMBODIMENTS

Figure 1:
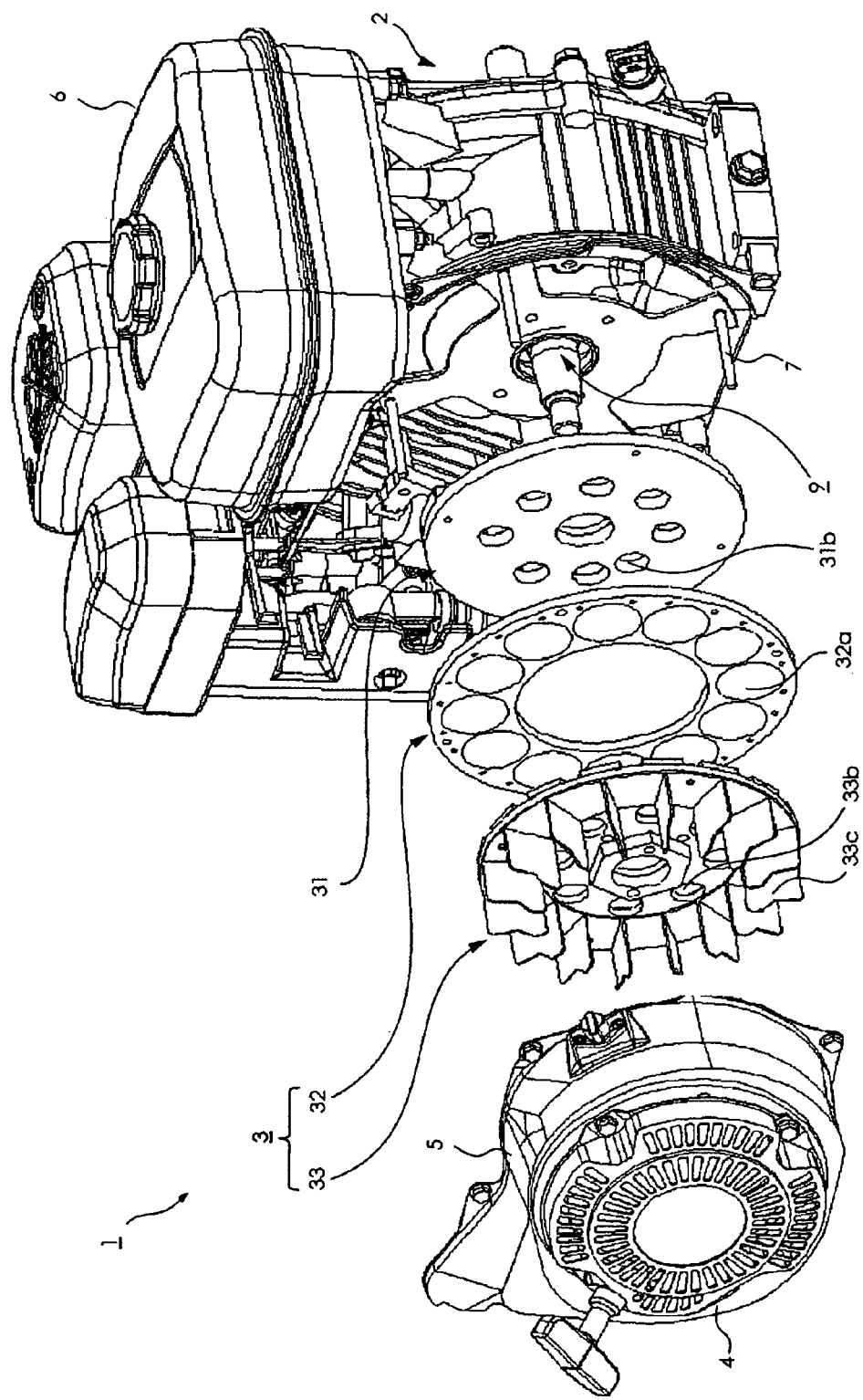
FIG. 1 is a development perspective view of a general purpose engine seen from one end side of a rotary shaft.
Figure 2:
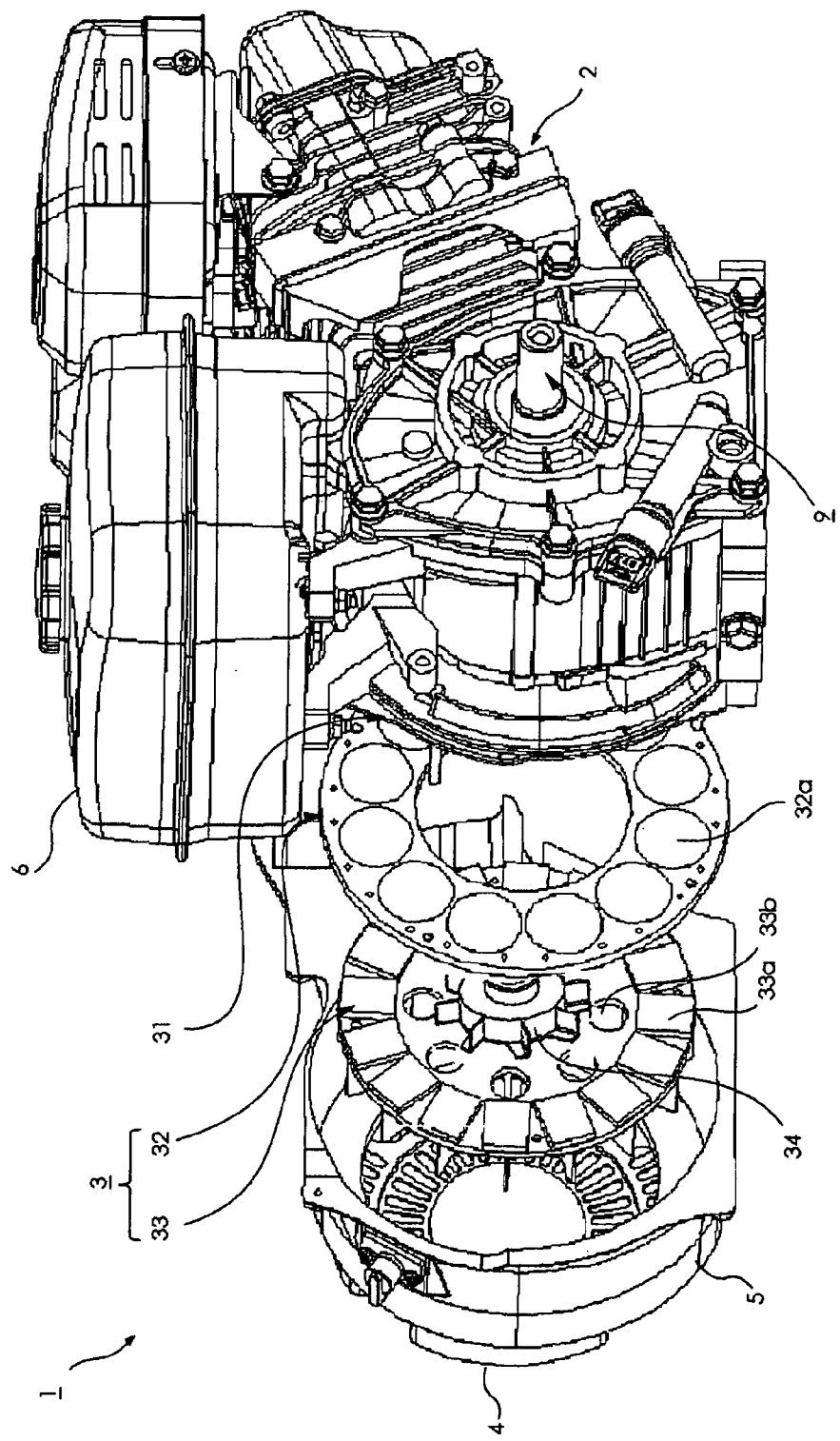
FIG. 2 is a development perspective view of the general purpose engine seen from another end side of the rotary shaft.
Figure 3:
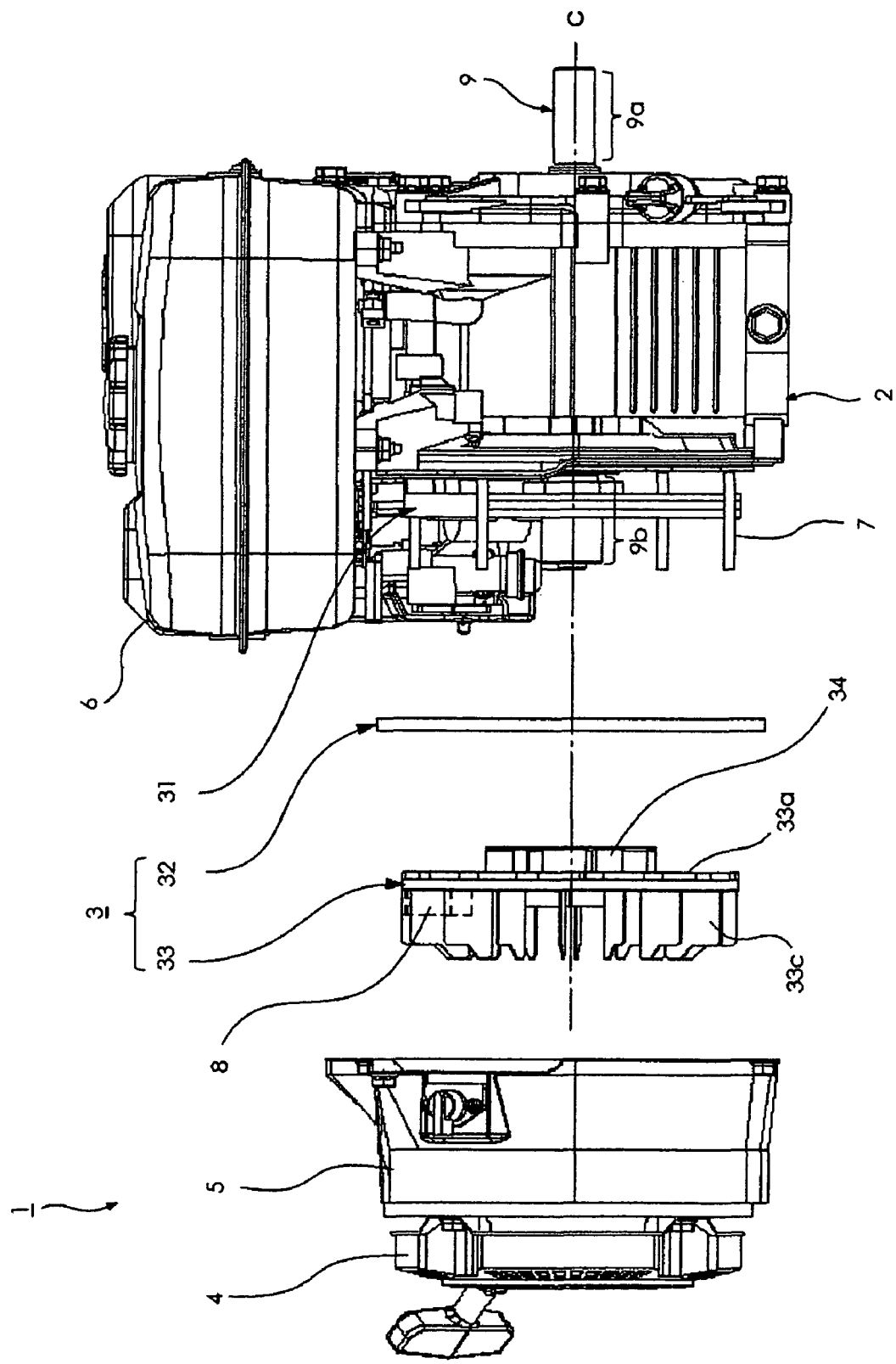
FIG. 3 is a development side view of the general purpose engine.

FIGS. 1 and 2 are development perspective views of a general purpose engine 1 according to this embodiment. FIG. 1 shows the general purpose engine 1 from one end side of a rotary shaft 9, and FIG. 2 shows the general purpose engine 1 from another end side of the rotary shaft 9. FIG. 3 is a development side view of the general purpose engine 1, and a reference symbol C in FIG. 3 denotes an axial direction of the rotary shaft 9. The general purpose engine 1 is formed by integrating an axial gap type motor/generator 3 with an engine main body 2, and is provided for a power generation application. The general purpose engine 1 is constituted mainly by the engine main body 2, the axial gap type motor/generator 3, a recoil starter 4, a housing 5, and a fuel tank 6.

The engine main body 2 has a similar constitution to a typical general purpose engine. The fuel tank 6 for storing fuel is attached to an upper portion of the engine main body 2. The rotary shaft 9 is rotated by the driving force of the engine main body 2. The rotary shaft 9 includes shaft parts 9a, 9b shown in FIG. 3, which project respectively from left and right side portions of the engine main body 2. An arbitrary external apparatus (not shown) provided separately to the general purpose engine 1 as an option can be attached to the shaft part 9a that projects from one side portion of the engine main body 2. Meanwhile, the axial gap type motor/generator 3 is attached integrally to the shaft part 9b that projects from the other side portion on the opposite side to the shaft part 9a.

The axial gap type motor/generator 3 is constituted mainly by a disc-shaped power generating rotor 33 (to be referred to hereafter as an "outer rotor") and a stator 32. In this specification, of the left and right side faces of the outer rotor 33, the side opposing the stator 32 will be referred to as an "opposing face", and the side that does not oppose the stator 32 will be referred to as a "non-opposing face" (likewise with respect to a back yoke 31 to be described below). The center of the outer rotor 33 is fixed to the rotary shaft 9 such that the outer rotor 33 rotates integrally with the rotary shaft 9. A plurality of power generating magnets 33a, for example neodymium-based permanent magnets, are attached in circumferential direction series to the opposing face of the outer rotor 33, and the polarities of adjacent power generating magnets 33a are alternately reversed. The stator 32 takes a ring shape with a hollow site formed in the center. The stator 32 is fixed to the engine main body 2 via a plurality of attachment members 7 extending in a substantially linear form. The stator 32 is disposed on the rotary shaft 9 on the inside of the outer rotor 33 and at a remove from the outer rotor 33 in the axial direction C of the rotary shaft 9. A plurality of coils 32a, for example concentrated windings, are connected and attached to the stator 32.

Further, a disc-shaped back yoke 31 that rotates integrally with the rotary shaft 9 is disposed adjacent to the axial gap type motor/generator 3 constituted by the members 32, 33 and further toward the inside of the rotary shaft 9 than the stator 32. The back yoke 31 is removed from the stator 32 in the axial direction C. The back yoke 31 is employed in a supplementary fashion to secure a flux path for the power generating magnets 33a in the outer rotor 33 efficiently (but is not required), and can be formed from a comparatively thin steel plate or the like, for example. Further, the back yoke 31 is provided with a plurality of air vents 31b. The air vents 31b, which are arranged in the circumferential direction, penetrate the back yoke 31 in the axial direction C. The air vents 31b function to cool both the engine main body 2 and the axial gap type motor/generator 3 in conjunction with sites 33b, 33c, 34 on the outer rotor 33 side.

The outer rotor 33 is provided with a plurality of cooling fins 33c, a plurality of air vents 33b, and a fin member 34. The cooling fins 33c, which are arranged in the circumferential direction, respectively stand upright from the non-opposing face of the outer rotor 33 in the axial direction C and extend in a substantially diametrical direction. Further, the air vents 33b, which are arranged in the circumferential direction, are provided on the inside of the cooling fins 33c and penetrate the outer rotor 33 in the axial direction C. A plurality of cooling fins extending in a diametrical direction are arranged on the outer periphery of the fin member 34 provided on the opposing surface of the outer rotor 33, and rotate integrally with the rotary shaft 9. Note that as long as the fin member 34 rotates integrally with the rotary shaft 9, it need not necessarily be formed integrally with the outer rotor 33, and can be formed integrally with the back yoke 31 or formed as a separate member to the members 31, 33. The fin member 34 is inserted into and housed in the hollow site of the stator 32.

The outer diameter of the back yoke 31 is smaller than the outer diameter of the stator 32 positioned on the outside thereof. The reason for this is to optimize the shape of an attachment member 7 used to attach the stator 32 to the engine main body 2 and suppress displacement (vibration amplitude) of the stator 32 caused by vibration of the engine main body 2. In this case, the site of the stator 32 (the site having a larger diameter than the back yoke 31) that projects in the diametrical direction (radial direction) is used as a site for fixing one end of the arm-shaped attachment member 7. Further, since the back yoke 31 has a smaller diameter than the stator 32, interference between the attachment member 7 and the back yoke 31 can be avoided even when the attachment member 7 takes a substantially linear shape having a minimum extension length.

The axial gap type motor/generator 3 is constituted by a pair including the outer rotor 33 and the stator 32, and a gap existing between the opposing face of the outer rotor 33 and the face of the stator 32 opposing the opposing the outer rotor 33 corresponds to an axial gap. Note that when the axial gap type motor/generator 3, which does not use a magnetic steel sheet, is employed, iron loss is reduced in comparison with a typical radial gap type motor/generator, and as a result, highly efficient power generation can be realized.

The outer rotor 33 fixed to the shaft part 9b of the rotary shaft 9 carries a certain amount of weight due not only to its own weight, but also the weight of the power generating magnets 33a embedded therein. Accordingly, the outer rotor 33 functions as a flywheel for stabilizing the rotary force of the rotary shaft 9, which varies over a single cycle of the engine main body 2, by means of inertial force generated when it rotates. The back yoke 31 can function similarly as a flywheel when it carries a certain amount of weight.

The recoil starter 4 is provided on the non-opposing face side of the outer rotor 33, or in other words on the outside of the outer rotor 33, to rotate the rotary shaft 9 forcibly during start-up of the engine main body 2. An intake port for taking in air to cool the engine main body 2 and the axial gap type motor/generator 3 is formed in the recoil starter 4. The axial gap type motor/generator 3 constituted as described above is substantially entirely covered by the housing 5. The housing 5 is shaped internally such that the air taken in through the intake port of the recoil starter 4 is led to the engine main body 2 side.

An ignition magnet 8 (see FIG. 3) for detecting a rotation angle of the rotary shaft 9 is attached to the outer rotor 33. In this embodiment, the ignition magnet 8 is attached to the non-opposing face side of the outer rotor 33, and the position of the ignition magnet 8, or in other words the rotation angle of the rotary shaft 9, is detected by a position detection sensor, not shown in the drawing. The position detection sensor is attached to the engine main body 2 so as to be positioned further toward the outside than an outer edge of the outer rotor 33, and detects the point at which it opposes the ignition magnet 8 in the diametrical direction of the outer rotor 33. In this case, the position detection sensor must be attached further toward the outside than the outer edge of the stator 32 to avoid interference with the stator 32, and therefore the gap between the position detection sensor and the ignition magnet 8 increases. However, sufficient detection precision for practical purposes can be secured. Note that when the ignition magnet 8 is attached to the outer rotor 33, ignition system members (not shown) such as an ignition coil are provided in the vicinity of the ignition magnet 8. By providing the ignition system members further toward the outside, clearance adjustment can be performed easily during maintenance.

Note that the ignition magnet 8 can be attached to the back yoke 31 rather than the outer rotor 33. For example, the ignition magnet 8 can be attached to the non-opposing face side of the outer rotor 33.

When the rotary shaft 9 is rotated by driving the engine main body 2, the outer rotor 33 formed integrally with the rotary shaft 9 also rotates. When the outer rotor 33 rotates, the power generating magnets 33a attached to the outer rotor 33 rotate about the axis of the rotary shaft 9, and as a result, a magnetic field surrounding the outer rotor 33 varies rapidly. Accordingly, an induced electric current generated by electromagnetic induction in the power generating magnets 33a flows into the coils 32a of the stator 32 disposed in the vicinity of the outer rotor 33. By means of this power generating mechanism, the axial gap type motor/generator 3 generates and outputs electric power.

Figure 4:
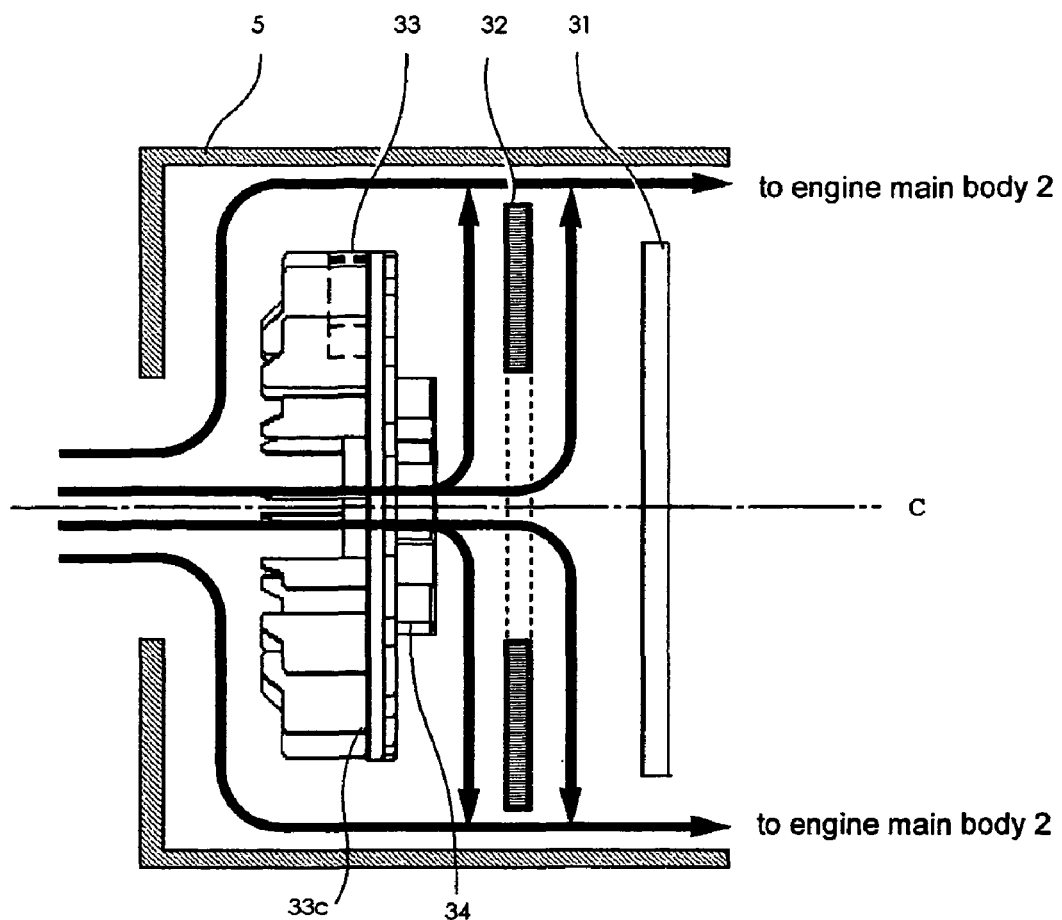
FIG. 4 is an illustrative view of a cooling mechanism employing an air flow.

FIG. 4 is an illustrative view of a cooling mechanism employing an air flow and provided in the housing 5. In the drawing, the members 31 to 33 are shown at a considerable remove from each other in the axial direction C, but this is merely to facilitate description, and in actuality, the members 31 to 33 are disposed in closer proximity such that the fin member 34 of the outer rotor 33 is inserted into the hollow site of the stator 32. When the rotary shaft 9 is rotated by driving the engine main body 2, the cooling fins 33c provided on the outer rotor 33 displace in a circumferential direction. As a result, a part of the air (outer air flow) that is taken in through the intake port of the recoil starter 4 is caused to flow out in the outer peripheral direction of the outer rotor 33 by the cooling fins 33c. This outside air flow flowing out to the outer periphery flows in the axial direction C while revolving around the interior shape of the housing 5 until it reaches the engine main body 2. The outer air flow cools an outer peripheral site of the outer rotor 33 and an outer peripheral site of the stator 32 (and also cools an outer peripheral site of the back yoke 31), and as a result, the engine main body 2 is cooled.

Further, when the rotary shaft 9 rotates, the fin member 34 formed integrally with the outer rotor 33 also rotates. As a result, a part of the air (inner air flow) that is taken in through the intake port of the recoil starter 4 passes through the air vents 33b in the outer rotor 33 and flows into the hollow site of the stator 32, or in other words the interior of the axial gap type motor/generator 3. When the fin member 34 rotates, a part of the inner air flow flowing into the interior flows out in the outer peripheral direction of the stator 32 through a gap (axial gap) between the outer rotor 33 and the stator 32. Another part of the inner air flow flows out in the outer peripheral direction of the stator 32 through a gap between the stator 32 and the back yoke 31. The inner air flow that flows out to the outer periphery then converges with the outer air flow. The inner air flow cools the back yoke 31 and the respective interiors of the stator 32 and the outer rotor 33. Another part of the inner air flow flows into the engine main body 2 through the air vents 31b in the back yoke 31. By means of this air flow, both the axial gap type motor/generator 3 and the engine main body 2 are cooled. Note that the air flow direction in the interior of the stator 32 is defined unambiguously by the relationship between the rotation direction of the rotary shaft 9 and the tilt direction of the fin member 34. Having reached the engine main body 2, the air is discharged to a width direction rear side (axle direction inner side).

According to this embodiment, the axial gap type motor/generator 3 serving as a power generating body is integrated with the engine main body 2. Therefore, the general purpose engine 1 can be provided for a power generation application without attaching a separate power generating body thereto as an external apparatus. Moreover, when an external apparatus is attached, use of the external apparatus and power generation by the axial gap type motor/generator 3 can be performed in parallel. The axial gap type motor/generator 3 is used as an integrated power generating body. Hence, increases in the axial direction length of the rotary shaft 9 can be suppressed. As a result, reductions in size and weight can be achieved in the general purpose engine 1 when the general purpose engine 1 is provided for a power generation application.

Typically, the axial gap type motor/generator 3 is advantaged over a radial gap type motor/generator in that the radial direction (diametrical direction) size thereof can be reduced. Accordingly, a flywheel provided in a pre-existing general purpose engine can be caused to function as the outer rotor 33 simply by attaching the power generating magnets 33a, without greatly modifying the size and other specifications of the flywheel or the specifications and so on of an engine main body of the general purpose engine. As a result, the general purpose engine 1 for a power generation application, which uses a pre-existing general purpose engine as a base, can be realized at low cost without greatly modifying the pre-existing design and specifications thereof, and moreover, an improvement in power generation capacity can be achieved while realizing reductions in size and weight.

When a pre-existing general purpose engine including a flywheel is used as a base, the plurality of power generating magnets 33a are attached in circumferential direction series to the opposing surface of the flywheel, which is attached to the shaft part 9b so as to rotate integrally with the rotary shaft 9. The stator 32 is then disposed on the rotary shaft 9 on the inside of the flywheel and at a remove from the flywheel. When this improvement is implemented on a pre-existing flywheel, the flywheel can be handled as a functional equivalent of the outer rotor 33. The back yoke 31, which is disposed on the rotary shaft 9 on the inside of the stator 32 and at a remove from the stator 32, can function in a similar manner as a flywheel.

Furthermore, according to this embodiment, the axial gap type motor/generator 3 and the engine main body 2 can be cooled effectively. More specifically, the outer air flow that flows out in the outer peripheral direction of the outer rotor 33 when the cooling fins 33c displace in the circumferential direction is led around the housing 5 to the engine main body 2 in the axial direction C. Further, the inner air flow that is taken in through the air vents 33b upon rotation of the fin member 34 passes through the gap from the hollow site of the stator 32 and then converges with the outer air flow. By means of the outer air flow and the inner air flow, the engine main body 2 and the axial gap type motor/generator 3 constituted by the outer rotor 33 and the stator 32 are cooled.

Moreover, according to this embodiment, the cooling fins 33c are formed on the outer rotor 33 disposed on the outside of the stator 32, and therefore a power generation function and a cooling function can be realized by a single member, enabling a reduction in the number of used wearable components. Furthermore, when the ignition magnet 8 is also attached to the outer rotor 33, an engine control function can be added thereto, enabling a further reduction in the number of components of the general purpose engine 1. Due to these effects, the axial gap type motor/generator 3 can be assembled easily, which contributes to an improvement in mass productivity.

Figure 5:
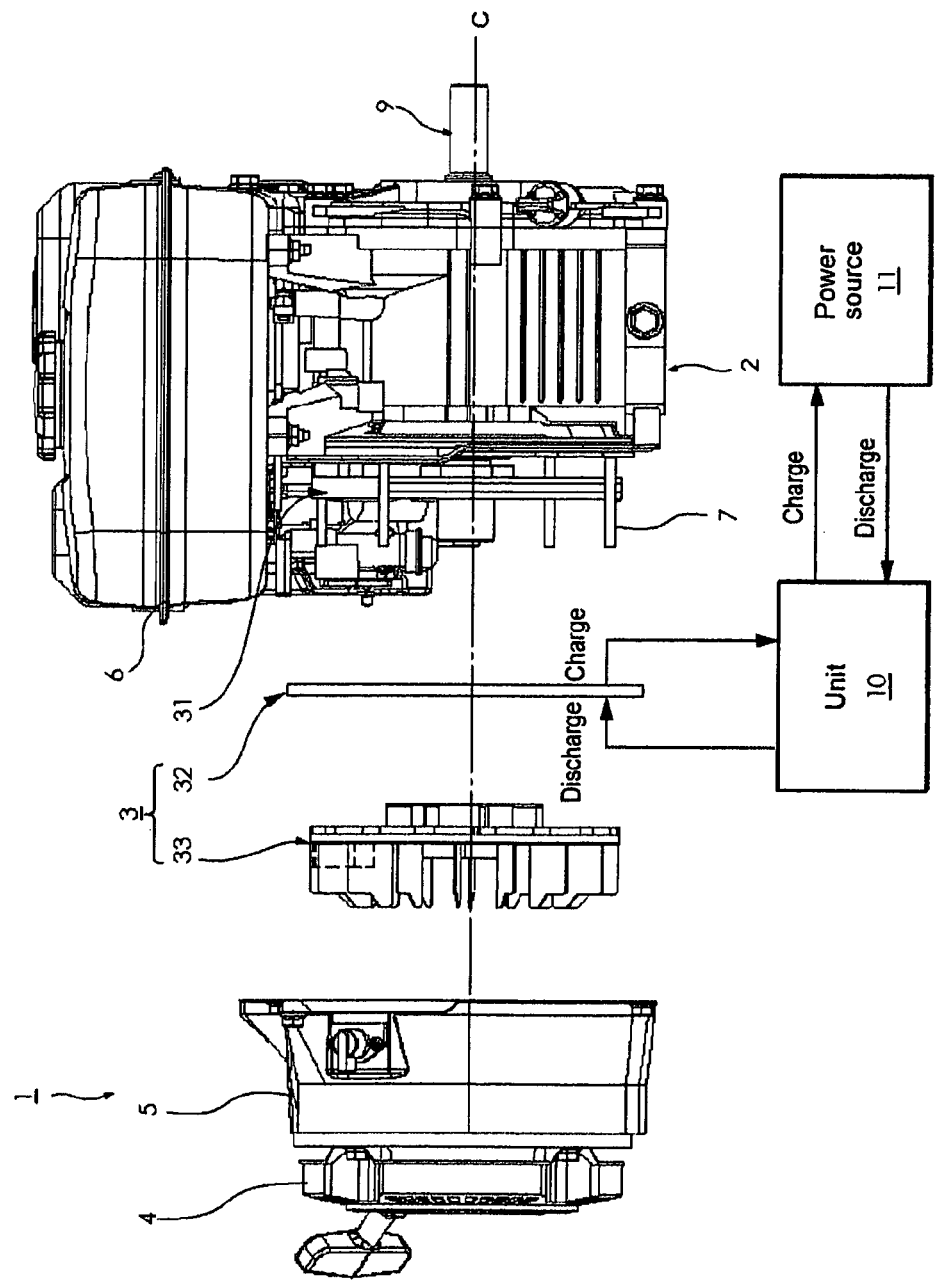
FIG. 5 is an illustrative view showing a charge/discharge system employing the general purpose engine.

Note that the embodiment described above focuses on power generation by the axial gap type motor/generator 3, or in other words charging, but both charging and discharge can be performed. FIG. 5 is an illustrative view showing a charge/discharge system employing the general purpose engine 1. During charging, the current that flows out of the stator 32 flows into a power source 11 via a unit 10. The unit 10 controls charge and discharge by the power source 11. The power source 11 is a storage apparatus capable of charge and discharge, such as a lead battery, a lithium ion battery, or a capacitor, for example. As a result, the kinetic energy of a rotary body is converted into electric energy with which the power source 11 is charged. During discharge, on the other hand, the current that flows out of the power source 11 flows into the stator 32 via the unit 10. As a result, electric energy is converted into the kinetic energy of the rotary body and the axial gap type motor/generator begins to rotate. When charge/discharge is employed in this manner, the axial gap type motor/generator 3 can be caused to function not only as a power generating body, but also as a starter of the general purpose engine 1. Note that switching between charge and discharge is performed by operating a switch provided on the unit 10.

What is claimed is:

1. A general purpose engine, comprising:
    an engine main body;
    a rotary shaft which is rotated by a driving force of said engine main body; and
    an axial gap type motor/generator attached integrally to said rotary shaft,
    wherein said axial gap type motor/generator comprises:
        a power generating rotor that rotates integrally with said rotary shaft;
        a stator that is attached to said engine main body, a distance between said power generating rotor and the engine main body being greater than a distance between said stator and the engine main body, wherein a central portion of said stator comprises a hollow site for air to flow from said power generating rotor toward said stator; and
        a fin member inserted into the hollow site of said stator.

2. The general purpose engine according to claim 1, wherein a plurality of magnets are attached, in circumferential direction series, to an opposing face of said power generating rotor opposing said stator, and
    wherein a plurality of coils are attached and connected to said stator.

3. The general purpose engine according to claim 1, further comprising a back yoke disposed on said rotary shaft on a side closer to said engine main body than said stator and at a predetermined distance from said stator.

4. The general purpose engine according to claim 3, further comprising an attachment member that extends in a substantially linear form,
    wherein an outer diameter of said stator is larger than an outer diameter of said back yoke, and
    wherein one end of said attachment member is attached to said engine main body and another end of said attachment member is attached to a site of said stator having a larger diameter than said back yoke.

5. The general purpose engine according to claim 1, further comprising a plurality of first fins provided on said power generating rotor and arranged in said circumferential direction.

6. The general purpose engine according to claim 5, further comprising an air vent provided in said power generating rotor on an inside of said first fins so as to penetrate said power generating rotor in an axial direction of said rotary shaft.

7. The general purpose engine according to claim 6, wherein the fin member rotates integrally with said rotary shaft, and a plurality of second fins are arranged on the fin member in said circumferential direction.

8. The general purpose engine according to claim 7, wherein said fin member is formed integrally with said power generating rotor or a back yoke disposed on said rotary shaft.

9. The general purpose engine according to claim 1, wherein said power generating rotor functions as a flywheel for stabilizing a rotary force of said rotary shaft, using self-generated inertial force.

10. The general purpose engine according to claim 1, wherein an ignition magnet for detecting a rotation angle of said rotary shaft is attached to said power generating rotor.

11. The general purpose engine according to claim 1, further comprising a recoil starter that is disposed on a side farther away from said engine main body than said power generating rotor and forcibly rotates said rotary shaft upon start-up of said engine main body.

12. A general purpose engine, comprising:
an engine main body;
a rotary shaft which is rotated by a driving force of said engine main body; and
an axial gap type motor/generator attached integrally to said rotary shaft,
wherein said axial gap type motor/generator comprises:
    a first flywheel that rotates integrally with said rotary shaft and stabilizes a rotary force of said rotary shaft, using self-generated inertial force;
    a stator which is attached to said engine main body, a distance between the first fly wheel and the engine main body being greater than a distance between the stator and the engine main body, and to which a plurality of coils are connected and attached, wherein a plurality of magnets is attached, in circumferential direction series, to an opposing face of said first flywheel opposing said stator, and wherein a central portion of said stator comprises a hollow site for air to flow from said first flywheel toward said stator; and
    a fin member inserted into the hollow site of said stator.

13. The general purpose engine according to claim 12, further comprising a second flywheel, which is disposed on said rotary shaft on a side closer to said engine main body than said stator and at a remove from said stator, and which functions as a back yoke.

14. The general purpose engine according to claim 13, further comprising an attachment member that extends in a substantially linear form, wherein an outer diameter of said stator is larger than an outer diameter of said second flywheel, and
    wherein one end of said attachment member is attached to said engine main body and another end of said attachment member is attached to a site of said stator having a larger diameter than said second flywheel.

15. The general purpose engine according to claim 12, further comprising a plurality of first fins provided on said first flywheel and arranged in said circumferential direction.

16. The general purpose engine according to claim 15, further comprising an air vent provided in said first flywheel on an inside of said first fins so as to penetrate said flywheel in an axial direction of said rotary shaft.

17. The general purpose engine according to claim 16, wherein the fin member rotates integrally with said rotary shaft, and a plurality of second fins are arranged on the fin member in said circumferential direction.

18. The general purpose engine according to claim 17, wherein said fin member is formed integrally with said first flywheel or said second flywheel.

19. The general purpose engine according to claim 12, wherein an ignition magnet for detecting a rotation angle of said rotary shaft is attached to said first flywheel.

20. The general purpose engine according to claim 12, further comprising a recoil starter that is disposed on an outside of said first flywheel and forcibly rotates said rotary shaft upon start-up of said engine main body.

* * * * *